United States Patent
Harrison et al.

(10) Patent No.: US 11,217,044 B1
(45) Date of Patent: Jan. 4, 2022

(54) MAP-BASED NOTIFICATION SYSTEM

(71) Applicant: Samsara Inc., San Francisco, CA (US)

(72) Inventors: Derrek Harrison, San Francisco, CA (US); Ingo Gerhard Wiegand, San Francisco, CA (US); David Liang, San Francisco, CA (US); John Charles Bicket, Burlingame, CA (US); Sushant Thakur, San Francisco, CA (US); James Michael Rowson, Tarrytown, NY (US); Sylvie Lee, Pittsburgh, PA (US); Bodecker John DellaMaria, Crystal Lake, IL (US); Kenshiro Nakagawa, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 17/302,744

(22) Filed: May 11, 2021

(51) Int. Cl.
  *G07C 5/06* (2006.01)
  *G01C 21/36* (2006.01)

(52) U.S. Cl.
  CPC ........... *G07C 5/06* (2013.01); *G01C 21/3691* (2013.01)

(58) Field of Classification Search
  CPC .............................. G01C 21/3691; G07C 5/06
  See application file for complete search history.

(56) References Cited

U.S. PATENT DOCUMENTS

| | | | |
|---|---|---|---|
| 9,539,901 B1 * | 1/2017 | Clauss | G08G 1/0969 |
| 10,156,456 B2 * | 12/2018 | Chen | G01S 19/51 |
| 10,431,083 B2 * | 10/2019 | Hamada | G08G 1/052 |
| 10,694,148 B1 * | 6/2020 | Li | G01C 21/005 |
| 2011/0010042 A1 * | 1/2011 | Boulet | G08G 1/052 701/31.4 |
| 2011/0172909 A1 * | 7/2011 | Kahn | G01C 21/165 701/533 |
| 2015/0334531 A1 * | 11/2015 | Albasheir | H04W 4/44 455/456.1 |
| 2016/0320199 A1 * | 11/2016 | Chen | G01C 21/3664 |
| 2016/0373896 A1 * | 12/2016 | Yamamoto | G01C 21/26 |
| 2017/0076597 A1 * | 3/2017 | Beattie, Jr | G08G 1/0129 |
| 2017/0205242 A1 * | 7/2017 | Schmidt | G06F 16/29 |
| 2018/0257655 A1 * | 9/2018 | Westover | B60W 50/10 |
| 2018/0268168 A1 * | 9/2018 | Herlocker | G06F 16/29 |
| 2019/0078904 A1 * | 3/2019 | Chen | G01C 21/362 |
| 2020/0130577 A1 * | 4/2020 | Mitra | G08G 1/0129 |
| 2020/0192386 A1 * | 6/2020 | Stenneth | G01C 21/3602 |
| 2021/0027620 A1 * | 1/2021 | Luk-Zilberman | G06T 7/20 |
| 2021/0117694 A1 * | 4/2021 | Luk-Zilberman | G06K 9/00711 |

* cited by examiner

*Primary Examiner* — Tyler J Lee
(74) *Attorney, Agent, or Firm* — Schwegman Lundberg & Woessner, P.A.

(57) ABSTRACT

A map-based notification system configured to perform operations that include: accessing a base-map that comprises a map-tile, the map-tile defining a speed limit of a location; receiving vehicle data that includes speed data; determining that the speed data from the vehicle data transgresses the speed limit associated with the location defined by the map-tile; and causing display of a notification in response to determining that the speed data from the vehicle data transgresses the speed limit associated with the location defined by the map-tile.

20 Claims, 7 Drawing Sheets

```
┌─────────────────────────────────────────────────────────────┐
│  ACCESSING A BASE-MAP THAT COMPRISES A MAP TILE, THE MAP-TILE│
│      DEFINING A SPEED LIMIT ASSOCIATED WITH A LOCATION      │
│                             302                              │
└─────────────────────────────────────────────────────────────┘
                              │
                              ▼
┌─────────────────────────────────────────────────────────────┐
│         RECEIVING VEHICLE DATA THAT INCLUDES SPEED DATA      │
│                             304                              │
└─────────────────────────────────────────────────────────────┘
                              │
                              ▼
┌─────────────────────────────────────────────────────────────┐
│    DETERMINING THAT THE SPEED DATA FROM THE VEHICLE DATA    │
│  TRANSGRESSES THE SPEED LIMIT ASSOCIATED WITH THE LOCATION  │
│                  DEFINED BY THE MAP-TILE                    │
│                             306                              │
└─────────────────────────────────────────────────────────────┘
                              │
                              ▼
┌─────────────────────────────────────────────────────────────┐
│     CAUSING DISPLAY OF A NOTIFICATION IN RESPONSE TO THE    │
│    DETERMINING THAT THE SPEED DATA FROM THE VEHICLE DATA    │
│  TRANSGRESSES THE SPEED LIMIT ASSOCAITED WITH THE LOCATION  │
│                             308                              │
└─────────────────────────────────────────────────────────────┘
```

RECEIVING AN IDENTIFICATION OF A DRIVER PROFILE, THE DRIVER PROFILE DEFINING A ROUTE THAT INCLUDES THE LOCATION
402

ACCESSING THE BASE-MAP THAT COMPRISES THE MAP-TILE THAT DEFINES THE SPEED LIMIT OF THE LOCATION IN RESPONSE TO THE IDENTIFICATION OF THE DRIVER PROFILE THAT DEFINES THE ROUTE THAT INCLUDES THE LOCATION
404

MAP-BASED NOTIFICATION SYSTEM

TECHNICAL FIELD

Embodiments of the present disclosure relate generally the field of fleet operation management systems for supporting operations of fleet vehicles and, more particularly, but not by way of limitation, to a system for speeding and rolling stop detection.

BACKGROUND

An Electronic Logging Device (ELD) is electronic hardware that is attached to commercial motor vehicles to record driving hours and may often track and record a rate of travel of the vehicle. Administrators of such systems may often apply global speed limits that define a maximum rate of travel that a vehicle may travel (e.g., 75 mph) before triggering a notification or alert. While such systems may be effective in notifying users of speeding above a single threshold, in the real world, speed limits vary from location to location.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

As discussed above, organizations may often employ the use of an ELD to monitor a vehicle among a fleet of vehicles. For example, through use of an ELD, an administrator of the organization may be notified of instances in which a vehicle exceeds a global speed-limit which may be defined by the administrator (e.g., 75 mph). While such systems may provide a high level indication of whether or not a vehicle associated with a fleet exceeded a globally defined speed limit, they are unable to determine if a driver of the vehicle may have exceeded some lower speed limit, associated with a specific location or road. Furthermore, other proposed solutions to provide real-time speed limit monitoring may rely on image recognition, or the use of a Global Positioning System (GPS) to transmit local speed limits in real-time. While these systems may provide a more detailed level of traffic information, such systems can be impractical to implement and may cause latency or resource management issues. Accordingly, a system to efficiently monitor, detect and notify an administrator of location specific moving violations would provide an improvement over existing system.

Example embodiments described herein relate to a system to detect moving violations, such as speeding, based on map data. According to certain example embodiments, a map-based notification system is configured to perform operations that include: accessing a base-map that comprises a map-tile, the map-tile defining a speed limit of a location; receiving vehicle data that includes speed data; determining that the speed data from the vehicle data transgresses the speed limit associated with the location defined by the map-tile; and presenting a notification in response to determining that the speed data from the vehicle data transgresses the speed limit associated with the location defined by the map-tile, wherein the notification may include an in-cab notification, such as an auditory or visual alert, as well as a notification which may be presented at one or more client devices, such as an email notification, an SMS notification, and a dashboard notification presented within a GUI.

In some example embodiments, the base-map may comprise one or more map-tiles, wherein each map tile among the one or more map-tiles includes speed limits and identifications of locations of stop signs, stop lights, rail roads, school zones, and the like. For example, a map-tile from among the one or more map-tiles may provide an indication of roads in a location represented by a map tile, wherein each road is labeled with a speed limit and locations of stop signs along the road.

In some embodiments, an administrator of the map-based notification system may provide inputs onto a location of a map image, wherein the location of the map image may correspond with a set of geo-location coordinates, to define elements that include: a speed limit of a location; locations of stop signs; locations of school zones; railroad tracks; and stop lights. In some embodiments, each of the elements may have corresponding rules or restrictions. For example, a location of a stop sign or railroad tracks may correspond with a rule within a database indicating that a vehicle must come to a complete stop at the location of the stop sign within a map-tile. Similarly, a location of a school zone may correspond with a rule that indicates a speed limit for the location, or in some embodiments may indicate a speed limit at a period of time (i.e., 7:00 AM to 5:00 PM).

For example, the map-based notification system may cause display of a graphical user interface that includes a display of a map image. An administrator of the map-based notification system may provide inputs onto the display of the map image to assign speed-limits to locations depicted in the map-tile, define positions of stop signs to locations within the map-tile, and the like. Accordingly, responsive to receiving the inputs that assign the speed-limits and other traffic rules to the locations depicted in the map image, the map-based notification system may assign the inputs to corresponding map data that may for example include geo-location coordinates. Similarly, the administrator may also define notification attributes, wherein the notification attributes may include the type of information which is presented in a notification based on each element within the map-tile, as well as where the notification may be sent. For example, an administrator of the map-based notification system may define a first set of notification attributes of a notification to be distributed upon detecting a speed of a vehicle transgressing a speed limit of a first location, and a second set of notification attributes of a notification to be distributed upon detecting a speed of a vehicle transgressing a speed limit of a second location.

In some example embodiments, the map-based notification system may selectively access a base-map that comprises a plurality of map-tiles based on an identification of a driver profile. For example, the map-based notification system may receive an identification of a driver profile, wherein the driver profile includes an identification of a route. The map-based notification system may curate a collection of map-tiles based on the route identified by the driver profile to generate a base-map.

In some example embodiments, the base-map may be loaded to a client device associated with the driver profile, or to a local memory location of the vehicle, such as within an ELD of the vehicle, responsive to receiving an identification of a driver profile. For example, the driver profile may include a vehicle identifier, wherein the vehicle identifier corresponds with a vehicle from among a fleet of vehicles associated with an organization. Responsive to receiving the identification of the driver profile, the map-based notification system may selectively access a base-map and load the base-map into a memory location associated with a vehicle identified by the driver profile.

In some example embodiments, the map-based notification system may selectively access a base-map based on location data received from a vehicle. For example, in some embodiments, a vehicle, or specialized hardware integrated into the vehicle, may be configured to transmit location data to the map-based notification system at the start of a trip, when the vehicle is turned on, or when a driver activates one or more components of the vehicle. Responsive to receiving the location data, the map-based notification system selectively accesses a base-map that comprises one or more map-tiles based on the received location data. For example, the map-tiles may represent locations within a threshold distance of a location identified by the location data. The threshold distance may be based on a physical distance (i.e., 5 miles), or may be based on a driving distance (i.e., 10 hour drive).

In some example embodiments, the map-based notification system may routinely update the base-map loaded into client device or ELD associated with the vehicle based on one or more trigger conditions. For example, responsive to determining that a vehicle may be approaching a threshold distance from a border of a first base-map, the map-based notification system may access a database to retrieve a second base-map. In some embodiments, the second base-map may be generated or otherwise accessed based on a trajectory of the vehicle. For example, the map-based notification system may collect a plurality of location data points and determine a trajectory of the vehicle based on the location data points.

From the perspective of a vehicle, upon receiving a base-map that comprises one or more map-tiles that define speed limits and locations of stop signs, one or more specially configured hardware components of the vehicle, including a client device associated with a driver of the vehicle, may routinely check or otherwise compare a current speed of the vehicle (i.e., based on vehicle data and accelerometer data) to a speed limit that corresponds with a location of the vehicle as defined by a map-tile. Responsive to determining that the current speed of the vehicle transgresses the speed limit defined by the map-tile, or similarly, responsive to determining that a vehicle did not come to a stop at a location of a stop sign, the map-based notification system may generate a notification to be transmitted to one or more client devices of an organization associated with the vehicle.

In some embodiments, the notification may include a display of a vehicle identifier associated with the vehicle, a driver identifier associated with a driver of the vehicle, location data indicating where the transgression of the speed limit or running of the stop sign occurred, and an indication of the speed of the vehicle. In some embodiments, the map-based notification system may be communicatively coupled with one or more sensor devices integrated within the vehicle, such as a dash-cam, a forward-facing camera, as well as motion sensors. Responsive to determining that the vehicle has transgressed a speed limit defined by a map-tile, the map-based notification system may activate at least a portion of the one or more sensor devices to capture additional information. Accordingly, the additional information may be included within a notification generated and transmitted by the map-based notification system.

Figure 1:
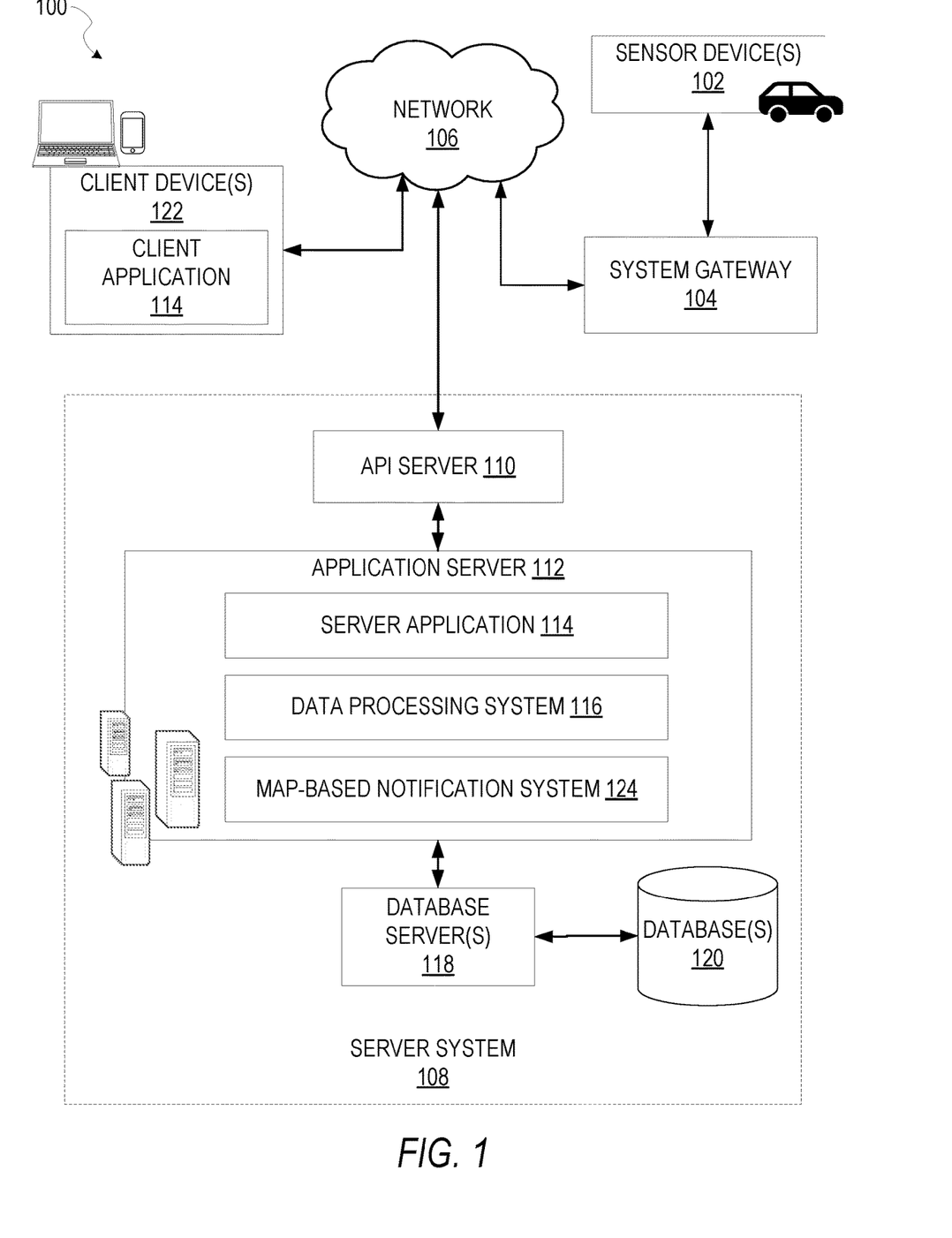
FIG. 1 is a block diagram showing an example system for exchanging data (e.g., sensor data and associated content) over a network in accordance with some embodiments, wherein the system includes a map-based notification system.

FIG. 1 is a block diagram showing an example system 100 for detecting instances of speeding and rolling stops based on map data, according to certain example embodiments. The system 100 includes one or more client devices 122 that host a number of applications including a client application 114.

Accordingly, each client application 114 is able to communicate and exchange data with another client application 114 and with the server application 114 executed at the server system 108 via the network 106. The data exchanged between client applications 114, and between a client application 114 and the server system 108, includes functions (e.g., commands to invoke functions) as well as payload data (e.g., text, audio, video or other multimedia data).

The server system 108 provides server-side functionality via the network 106 to a particular client application 114, and in some embodiments to the sensor device 102 and the system gateway 104. While certain functions of the system 100 are described herein as being performed by either a client application 114, the sensor device 102, the system gateway 104, or by the server system 108, it will be appreciated that the location of certain functionality either within the client application 114, the system gateway 104, or the server system 108 is a design choice. For example, it may be technically preferable to initially deploy certain technology and functionality within the server system 108, but to later migrate this technology and functionality to the client application 114, or one or more processors of the sensor device 102, or system gateway 104, where there may be sufficient processing capacity.

In some embodiments, the system gateway 104 may be configured to execute all or some of the operations which may be performed by the map-based notification system 124. For example, the map based notification system 124 may be configured to access map-tiles within the databases 120 in order to curate a base-map, wherein the map-tiles define speed limits and locations of stop signs in a given location, according to some example embodiments. Accordingly, some or all of these operations may be performed within the system gateway 104 itself.

The server system 108 supports various services and operations that are provided to the client application 114. Such operations include transmitting data to, receiving data from, and processing data generated by the client application 114, the sensor devices 102, and the system gateway 104. In some embodiments, the sensor devices 102 may include an odometer associated with a vehicle, as well as a GPS associated with the vehicle. In some embodiments, this data includes, message content, device information, geolocation information, persistence conditions, social network information, sensor data, and live event information, as examples. In other embodiments, other data is used. Data exchanges within the system 100 are invoked and controlled through functions available via graphical user interfaces (GUIs) of the client application 114.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data associated with data generated by the sensor device 102 and processed by the application server 112.

Dealing specifically with the API server 110, this server receives and transmits data (e.g., sensor data, commands, and payloads) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, the sending of sensor data (e.g., images, video, geolocation data, inertial data, temperature data, etc.) from a client application 114 to the server application 114, and for possible access by another client application 114, the setting of a collection of data, the retrieval of such collections, the retrieval of data, and the location of devices within a region.

In some embodiments, the application server 112 may host a number of applications and subsystems, including a server application 114, and a map-based notification system 124. The map-based notification system 124 is configured to access map-tiles within the databases 120 in order to curate a base-map, wherein the map-tiles define speed limits and locations of stop signs in a given location, according to some example embodiments. Further details of the map-based notification system 124 can be found in FIG. 2 below.

The server application 114 implements a number of data processing technologies and functions, particularly related to the aggregation and other processing of data (e.g., sensor data generated by the sensor device 102). As will be described in further detail, the sensor data, including odometer data points and GPS data points, generated by the sensor device 102 may be aggregated into collections associated with a particular user account. Other processor and memory intensive processing of data may also be performed server-side by the server application 114, in view of the hardware requirements for such processing.

The application server 112 is communicatively coupled to a database server 118, which facilitates access to a database 120 in which is stored data associated with sensor data generated by the sensor device 102 and processed by the server application 114.

Figure 2:
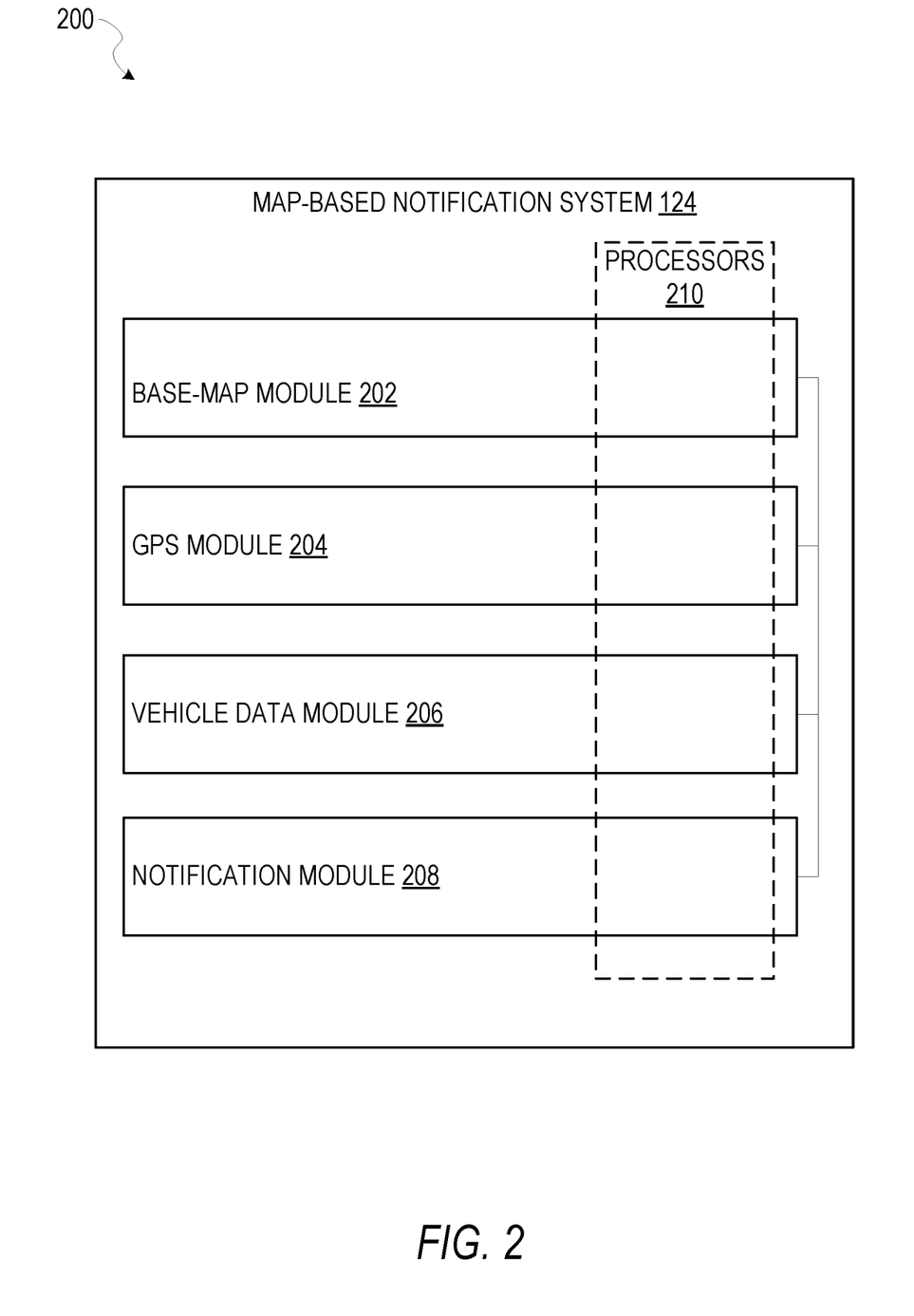
FIG. 2 is a block diagram illustrating various modules of a map-based notification system, according to certain example embodiments.

FIG. 2 is a block diagram 200 illustrating components of the map-based notification system 124 that configure the map-based notification system 124 to perform operations that include accessing a base-map that comprises a map-tile, the map-tile defining a speed limit of a location; receiving vehicle data that includes speed data; determining that the speed data from the vehicle data transgresses the speed limit associated with the location defined by the map-tile; and causing display of a notification in response to determining that the speed data from the vehicle data transgresses the speed limit associated with the location defined by the map-tile, according to certain example embodiments.

The map-based notification system 124 is shown as including a base-map module 202, a GPS module 204, a vehicle data module 206, and a display module 208, all configured to communicate with each other (e.g., via a bus, shared memory, or a switch). Any one or more of these modules may be implemented using one or more processors 210 (e.g., by configuring such one or more processors to perform functions described for that module) and hence may include one or more of the processors 210. In certain embodiments, one or more modules of the map-based notification system 124 may be executed by the system gateway 104.

Any one or more of the modules described may be implemented using hardware alone (e.g., one or more of the processors 210 of a machine) or a combination of hardware and software. For example, any module described of the map-based notification system 124 may physically include an arrangement of one or more of the processors 210 (e.g., a subset of or among the one or more processors of the machine) configured to perform the operations described herein for that module. As another example, any module of the map-based notification system 124 may include software, hardware, or both, that configure an arrangement of one or more processors 210 (e.g., among the one or more processors of the machine) to perform the operations described herein for that module. Accordingly, different modules of the map-based notification system 124 may include and configure different arrangements of such processors 210 or a single arrangement of such processors 210 at different points in time. Moreover, any two or more modules of the map-based notification system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
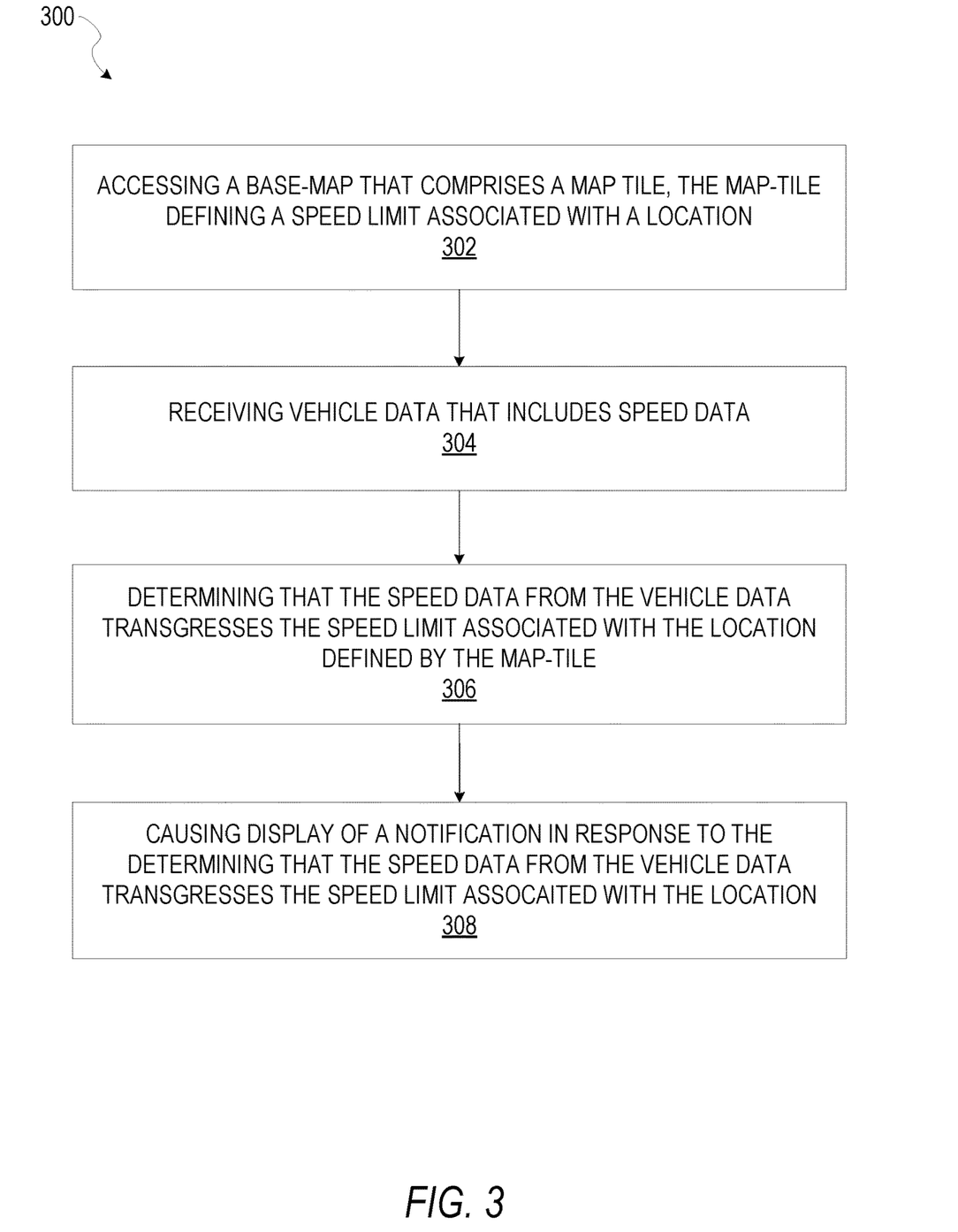
FIG. 3 is a flowchart depicting a method of presenting a notification, according to certain example embodiments.

FIG. 3 is a flowchart depicting a method 300 of presenting a notification, according to certain example embodiments. Operations of the method 300 may be performed by the modules described above with respect to FIG. 2. As shown in FIG. 3, the method 300 includes one or more operations 302, 304, 306, and 308.

At operation 302, the base-map module 202 accesses a base-map that comprises at least one map-tile, wherein the map-tile defines speed limits and locations of stop signs of one or more locations depicted within the map-tile. For example, the base-map module 202 may access the base-map responsive to a trigger event, such as a driver entering a vehicle, or detecting that the vehicle is about to start a trip.

In some embodiments, the base-map module 202 may selectively access or curate a base-map by compiling one or more map-tiles based on a set of received criteria. For example, the base-map module 202 may curate a set of map-tiles based on location data received from the vehicle or based on a route received from the vehicle, wherein the route identifies a region or set of locations.

At operation 304, the vehicle data module 206 receives vehicle data that includes speed data. In some embodiments, the vehicle data module 206 may be configured to collect vehicle data at a predefined interval. In some embodiments, the vehicle data module 206 may collect vehicle data from the vehicle responsive to entering into a new map-tile or crossing into a location in which a speed limit is defined by a map-tile.

Based on the vehicle data, at operation 306, the vehicle data module 206 determines that a speed of the vehicle transgresses a speed limit associated with a location of the vehicle as defined by a map-tile. Responsive to the vehicle data module 206 determining that the speed of the vehicle transgresses a speed limit of a location defined by a map-tile, at operation 308 the notification module 208 causes display of a notification.

In some embodiments, the notification may be displayed at a client device 122 associated with the vehicle, such as a mobile device of a driver of the vehicle, or an ELD integrated into the vehicle. For example, the notification may cause an auditory alert and an indication of a speed traveled by the vehicle. In some embodiments, the notification module 208 may identify one or more client devices associated with the vehicle and presents the notification to at least a portion of the one or more client devices.

The notification may include a display of a vehicle identifier associated with the vehicle, a driver identifier associated with the vehicle, as well as an indication of the vehicle speed and the location of the vehicle. In some embodiments, the notification may also include a presentation of image data or video data.

In some embodiments, the notification may include an in-cab notification presented within the vehicle itself, such as a visual or auditory alert. For example, the notification may include an auditory alert such as a chime, or a visual alert such as an illuminated LED light.

Figure 4:
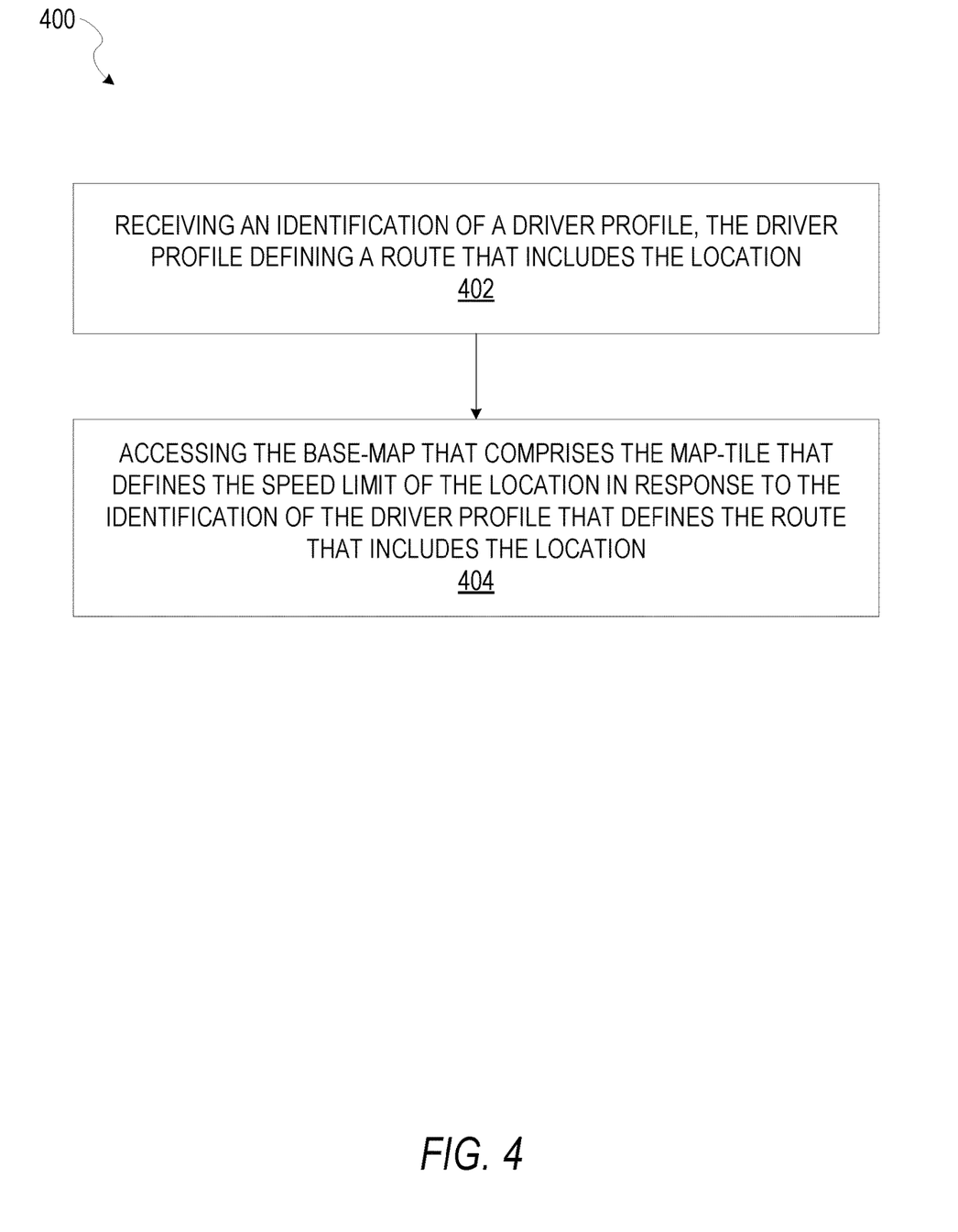
FIG. 4 is a flowchart depicting a method of selectively accessing a base-map, according to certain example embodiments

FIG. 4 is a flowchart depicting a method 400 of selectively accessing a base-map, according to certain example embodiments. Operations of the method 400 may be performed by the modules described above with respect to FIG. 2. As shown in FIG. 4, the method 400 includes one or more operations 402, and 404.

At operation 402, the base-map module 202 receives an identification of a driver profile, wherein the driver profile includes an indication of a route or destination. For example, a driver associated with an organization may provide an input into a client device 122, wherein the input indicates that the driver is about to depart on a route. In some embodiments, the base-map module 202 may receive the identification of the driver profile from a vehicle upon the driver entering into the vehicle. For example, a vehicle may be equipped with one or more sensor devices 102, wherein the sensor devices 102 may capture identifying information associated with the driver. The identifying information may for example include facial features, as well as a driver identifier associated with the driver which may be transmitted by a client device 122 associated with the driver to the sensor devices 102 upon entering the vehicle, or based on proximity to the vehicle.

Responsive to the base-map module 202 receiving the identification of the driver profile, at operation 404, the base-map module 202 selectively accesses a base-map that comprises one or more map-tiles, wherein the one or more map-tiles include indications of speed limits and locations of stop signs within one or more locations. For example, the driver profile may include an identification of an organization, wherein the organization may be associated with one or more map-tiles within the databases 120. In some embodiments, the driver profile may include an identification of a route, or destination, such that the base-map module 202 may retrieve one or more map-tiles from among the databases 120 based on the route or destination.

The base-map module 202 may generate a base-map based on the curated map-tiles, and upload the base-map to a client device associated with the driver or vehicle, such as the client device 122, or to specially configured hardware located within the vehicle, such as the GPS module 204.

Figure 5:
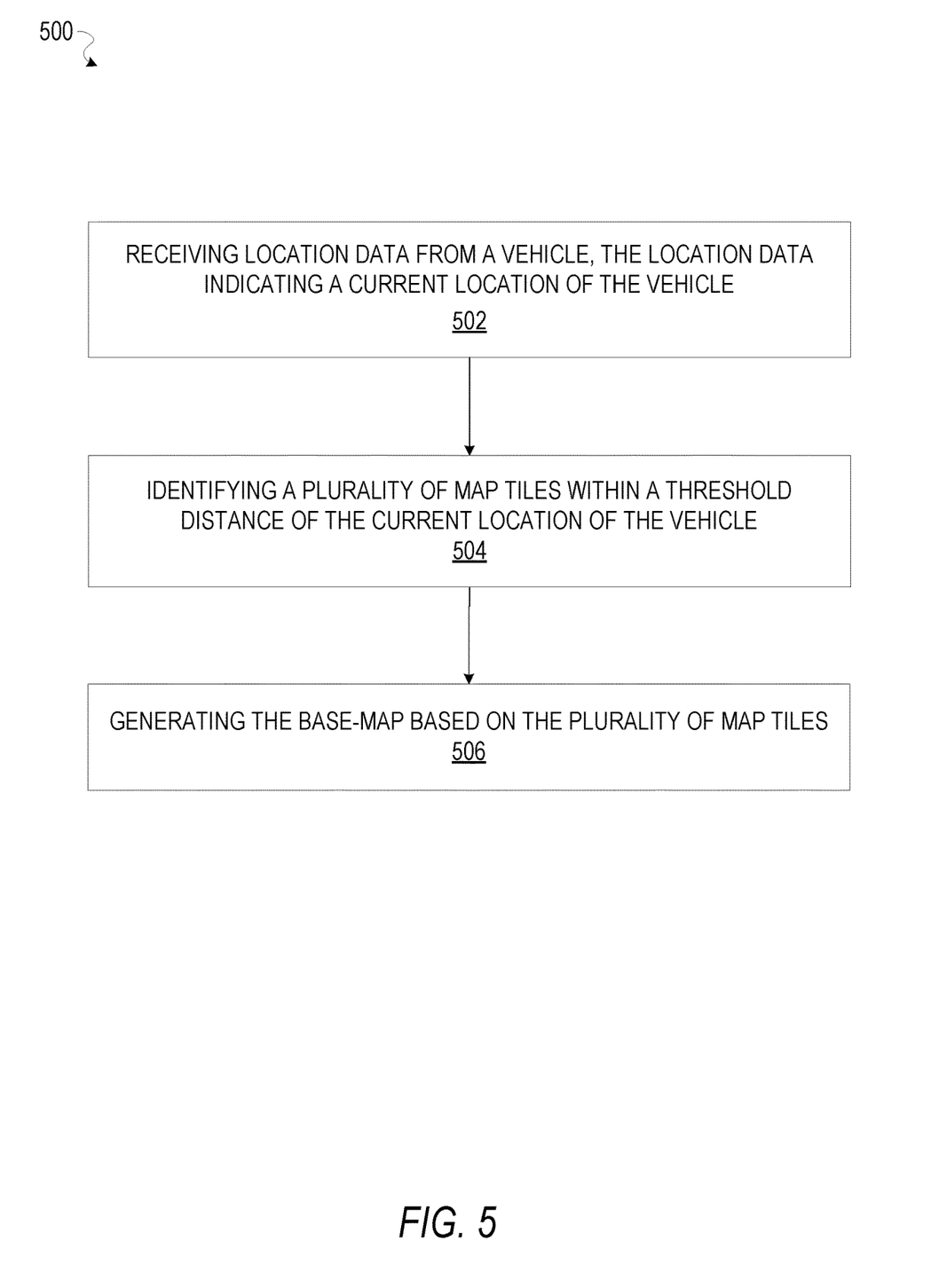
FIG. 5 is a flowchart depicting a method of generating a base-map, according to certain example embodiments.

FIG. 5 is a flowchart depicting a method 500 of generating a base-map, according to certain example embodiments. Operations of the method 500 may be performed by the modules described above with respect to FIG. 2. As shown in FIG. 5, the method 500 includes one or more operations 502, 504, and 506.

At operation 502, the GPS module 204 receives location data from a vehicle, wherein the location data indicates a current location of the vehicle. For example, the GPS module 204 may receives the location data from the vehicle responsive to the vehicle starting a trip, or a driver of the vehicle starting the vehicle (i.e., starting the ignition).

At operation 504, responsive to the GPS module 204 receiving the location data from the vehicle, the base-map module 202 identifies a plurality of map-tiles from among a collection of map-tiles based on the location data. For example, the base-map module 202 may identify a plurality of map-tiles within a threshold distance of the current location of the vehicle.

At operation 506, the base-map module 204 generates a base-map based on the plurality of map-tiles, and loads the base-map into a client device 122 associated with the vehicle, or into specially configured hardware associated with the vehicle.

Figure 6:
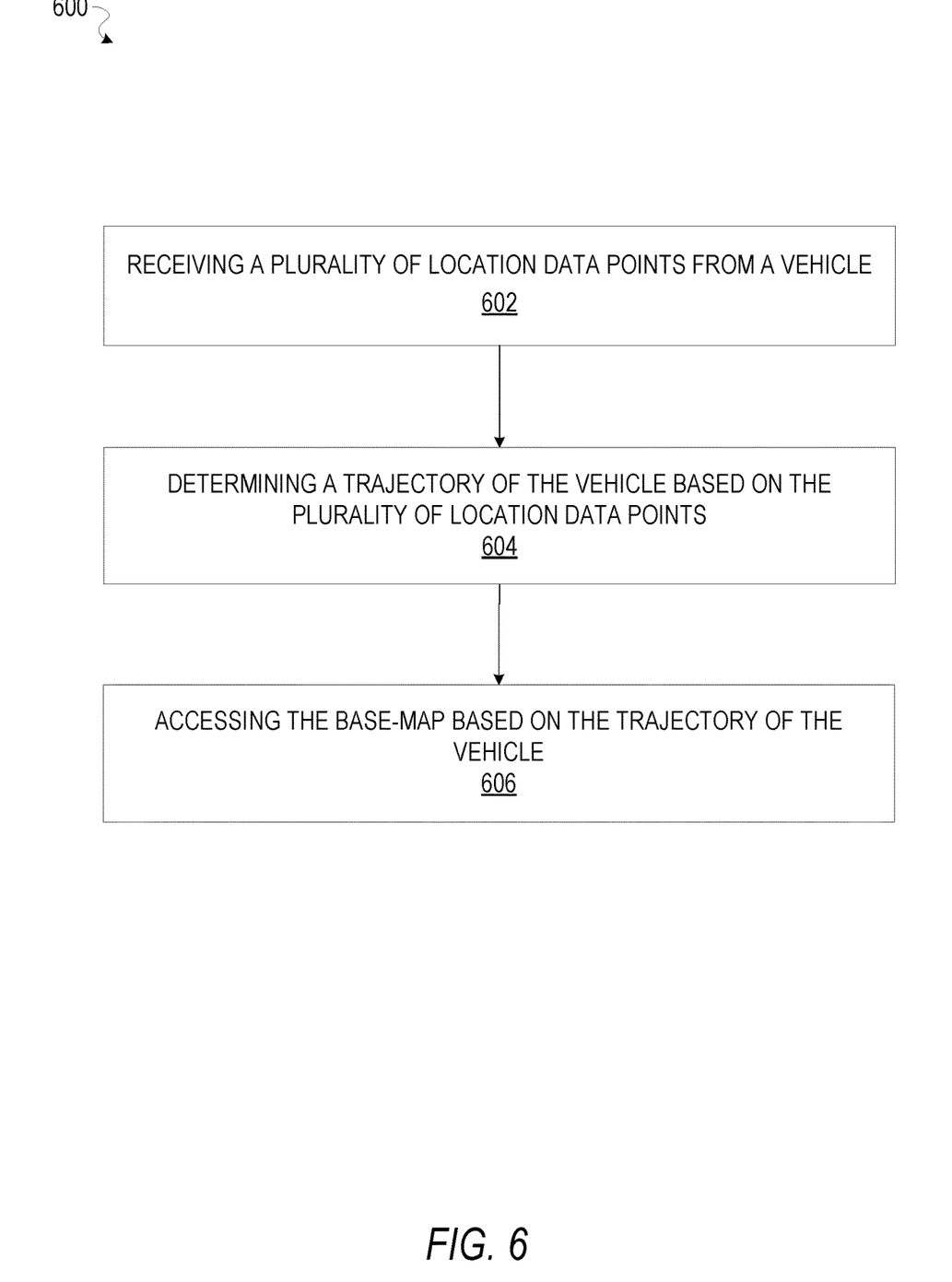
FIG. 6 is a flowchart depicting a method of selectively accessing a base-map, according to certain example embodiments.

FIG. 6 is a flowchart depicting a method 600 of selectively accessing a base-map, according to certain example embodiments. Operations of the method 600 may be performed by the modules described above with respect to FIG. 2. As shown in FIG. 6, the method 600 includes one or more operations 602, 604, and 606. The method 600 may be performed as a precursor to, or subroutine of, one or more of the operations of the method 300, as depicted in FIG. 3.

At operation 602, the GPS module 204 receives a plurality of location data points from a vehicle. For example, the vehicle may be configured to transmit location data to the GPS module 204 at a predefined interval, while the vehicle is in motion.

Responsive to receiving the plurality of location data points, at operation 604, the GPS module 204 determines a trajectory of the vehicle. For example, each location data point may include a timestamp, and may therefore indicate a location of the vehicle at a time defined by the timestamp. A sequence of location data points may be interpolated by the map-based notification system to determine a speed of a vehicle and a trajectory of the vehicle.

Based on the trajectory of the vehicle, at operation 606, the base-map module 202 accesses a collection of map-tiles to identify one or more map-tiles that correspond with locations that the vehicle is likely to enter. The base-map module 202 may thereby generate a base-map to be loaded to a client device 122 associated with the vehicle, based on the one or more map-tiles.

Figure 7:
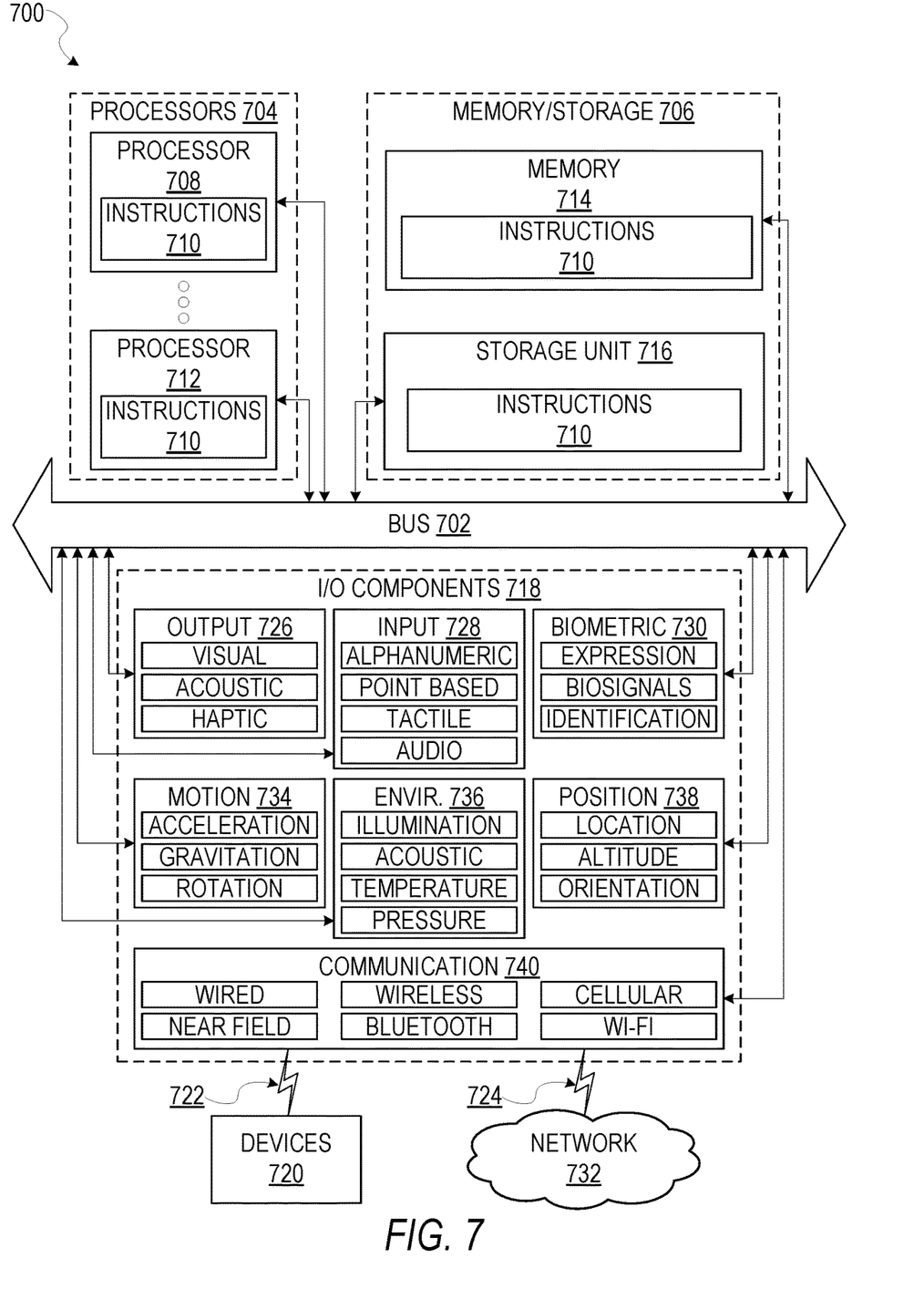
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental environment components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   accessing a base-map that comprises a map tile, the map-tile defining a speed limit associated with a location;
   receiving vehicle data from a sensor device associated with a vehicle, the vehicle data comprising speed data;
   determining that the speed data from the vehicle data transgresses the speed limit associated with the location defined by the map-tile; and
   presenting a notification that includes an identifier associated with the vehicle in response to determining that the speed data from the vehicle data transgresses the speed limit associated with the location defined by the map-tile.

2. The method of claim 1, wherein the accessing the base-map further comprises:
   receiving an identification of a driver profile, the driver profile defining a route that includes the location; and
   accessing the base-map that comprises the map-tile that defines the speed limit of the location in response to the identification of the driver profile that defines the route that includes the location.

3. The method of claim 2, wherein the notification includes a display of the driver profile.

4. The method of claim 1, wherein the accessing the base-map further comprises:
   receiving location data from a vehicle, the location data indicating a current location of the vehicle;
   identifying a plurality of map tiles within a threshold distance of the current location of the vehicle; and
   generating the base-map based on the plurality of map tiles.

5. The method of claim 1, wherein the accessing the base-map further comprises:
   receiving a plurality of location data points from a vehicle;
   determining a trajectory of the vehicle based on the plurality of location data points; and
   accessing the base-map based on the trajectory of the vehicle.

6. The method of claim 1, wherein the vehicle data includes an identification of an organization, and the causing display of the notification includes:
   identifying a client device associated with the organization; and
   causing display of the notification at the client device.

7. The method of claim 1, wherein the method further comprises:
- receiving an input that assigns the speed limit to the location; and
- assigning the speed limit to the location within the map tile based on the input.

8. The method of claim 1, wherein the receiving the input includes:
- causing display of a map image that comprises a presentation of the location; and
- receiving a selection of the presentation of the location from the map image.

9. A system comprising:
- a memory;
- one or more sensor devices; and
- at least one hardware processor to perform operations comprising:
  - accessing a base-map that comprises a map tile, the map tile defining a speed limit of a location;
  - receiving vehicle data that includes speed data, from the one or more sensor devices;
  - determining that the speed data from the vehicle data transgresses the speed limit associated with the location defined by the map-tile; and
  - presenting a notification that includes an identifier associated with a vehicle in response to determining that the speed data from the vehicle data transgresses the speed limit associated with the location defined by the map-tile.

10. The system of claim 9, wherein the accessing the base-map further comprises:
- receiving an identification of a driver profile, the driver profile defining a route that includes the location; and
- accessing the base-map that comprises the map-tile that defines the speed limit of the location in response to the identification of the driver profile that defines the route that includes the location.

11. The system of claim 10, wherein the notification includes a display of the driver profile.

12. The system of claim 9, wherein the accessing the base-map further comprises:
- receiving location data from a vehicle, the location data indicating a current location of the vehicle;
- identifying a plurality of map tiles within a threshold distance of the current location of the vehicle; and
- generating the base-map based on the plurality of map tiles.

13. The system of claim 9, wherein the accessing the base-map further comprises:
- receiving a plurality of location data points from a vehicle;
- determining a trajectory of the vehicle based on the plurality of location data points; and
- accessing the base-map based on the trajectory of the vehicle.

14. The system of claim 9, wherein the vehicle data includes an identification of an organization, and the causing display of the notification includes:
- identifying a client device associated with the organization; and
- causing display of the notification at the client device.

15. The system of claim 9, wherein the operations further comprise:
- receiving an input that assigns the speed limit to the location; and
- assigning the speed limit to the location within the map tile based on the input.

16. The system of claim 15, wherein the receiving the input includes:
- causing display of a map image that comprises a presentation of the location; and
- receiving a selection of the presentation of the location from the map image.

17. A non-transitory machine-readable storage medium comprising instructions that, when executed by one or more processors of a machine, cause the machine to perform operations comprising:
- accessing a base-map that comprises a map tile, the map tile defining a speed limit of a location;
- receiving vehicle data from a sensor device associated with a vehicle, the vehicle data comprising speed data;
- determining that the speed data from the vehicle data transgresses the speed limit associated with the location defined by the map-tile; and
- presenting a notification that includes an identifier associated with the vehicle in response to determining that the speed data from the vehicle data transgresses the speed limit associated with the location defined by the map-tile.

18. The non-transitory machine-readable storage medium of claim 17, wherein the accessing the base-map further comprises:
- receiving an identification of a driver profile, the driver profile defining a route that includes the location; and
- accessing the base-map that comprises the map-tile that defines the speed limit of the location in response to the identification of the driver profile that defines the route that includes the location.

19. The non-transitory machine-readable storage medium of claim 18, wherein the notification includes a display of the driver profile.

20. The non-transitory machine-readable storage medium of claim 17, wherein the accessing the base-map further comprises:
- receiving location data from a vehicle, the location data indicating a current location of the vehicle;
- identifying a plurality of map tiles within a threshold distance of the current location of the vehicle; and
- generating the base-map based on the plurality of map tiles.

* * * * *